United States Patent
Michael et al.

(10) Patent No.: US 10,618,073 B2
(45) Date of Patent: Apr. 14, 2020

(54) SEPARATING POWDER FILTER AND POWDER DELIVERY SYSTEM COMPRISING A SEPARATING POWDER FILTER

(71) Applicant: GEMA SWITZERLAND GMBH, St. Gallen (CH)

(72) Inventors: Hanspeter Michael, Gossau (CH); Marco Sanwald, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 0 days.

(21) Appl. No.: 15/738,118

(22) PCT Filed: May 3, 2016

(86) PCT No.: PCT/EP2016/059908
§ 371 (c)(1),
(2) Date: Dec. 19, 2017

(87) PCT Pub. No.: WO2016/206846
PCT Pub. Date: Dec. 29, 2016

(65) Prior Publication Data
US 2018/0169683 A1 Jun. 21, 2018

(30) Foreign Application Priority Data
Jun. 26, 2015 (DE) .......... 10 2015 110 312

(51) Int. Cl.
*B05B 12/14* (2006.01)
*B05B 7/14* (2006.01)
(Continued)

(52) U.S. Cl.
CPC ........ *B05B 12/1409* (2013.01); *B05B 7/1404* (2013.01); *B05B 12/149* (2013.01); *F16K 11/072* (2013.01); *F16K 31/12* (2013.01)

(58) Field of Classification Search
CPC .................................................. B05B 12/1409
(Continued)

(56) References Cited

U.S. PATENT DOCUMENTS 3,782,632 A * 1/1974 Braun ................... B05B 7/1404
222/144.5
3,924,810 A * 12/1975 Otterstetter ........... B05B 5/1683
239/305

(Continued)

FOREIGN PATENT DOCUMENTS

DE 2237507 A1 2/1973
DE 2548463 A1 5/1976
(Continued)

OTHER PUBLICATIONS

German Office Action, for German Patent Application No. 102015110312.5, dated Feb. 8, 2016, 5 pages.
(Continued)

*Primary Examiner* — William R Harp
(74) *Attorney, Agent, or Firm* — Kinney & Lange, P.A.

(57) ABSTRACT

The invention relates to a separating powder filter, particularly for supplying different types and/or sorts of powder, as selected, to a powder delivery device. The separating powder filter comprises the following: a first powder inlet, at least one additional, second powder inlet, and a powder outlet. Either the first powder inlet or the at least one second powder inlet can be fluidically connected to the powder outlet of the separating powder filter.

22 Claims, 6 Drawing Sheets

(51) Int. Cl.
*F16K 11/072* (2006.01)
*F16K 31/12* (2006.01)

(58) Field of Classification Search
USPC .......................................................... 406/183
See application file for complete search history.

(56) References Cited

U.S. PATENT DOCUMENTS

| | | | | |
|---|---|---|---|---|
| 4,669,505 A | * | 6/1987 | Nelson | B65G 53/56 137/874 |
| 5,226,759 A | * | 7/1993 | Hilmer | B65G 53/56 406/182 |
| 6,030,152 A | * | 2/2000 | Steele | B65G 53/56 406/182 |
| 8,567,341 B1 | * | 10/2013 | Thies | B05B 7/1404 118/310 |

FOREIGN PATENT DOCUMENTS

| | | |
|---|---|---|
| DE | 4329101 A1 | 3/1995 |
| DE | 19705381 A1 | 8/1998 |
| DE | 10115471 A1 | 10/2002 |
| DE | 10300280 A1 | 7/2004 |
| DE | 60111607 T2 | 4/2006 |
| EP | 2361691 A1 | 8/2011 |
| JP | H04358554 A | 12/1992 |
| WO | 2004050259 A1 | 6/2004 |

OTHER PUBLICATIONS

International Preliminary Report on Patentability, for PCT Patent Application No. PCT/EP2016/059908, dated Sep. 26, 2017, 7 pages.
German Office Action dated Oct. 15, 2018, received for corresponding German Application No. 10 2015 110 312.5.

* cited by examiner

SEPARATING POWDER FILTER AND POWDER DELIVERY SYSTEM COMPRISING A SEPARATING POWDER FILTER

BACKGROUND

The present invention relates to a powder separating filter, particularly for alternatingly supplying different types and/or kinds of powders to a powder dispensing device such as for example a powder spray gun. The invention further relates to a powder dispensing system comprising a powder dispensing device and a powder separating filter.

Using powder dispensing devices for example in the form of manual or automatic powder spray guns to spray coat objects with coating powder is known and common in powder coating technology, whereby the powder dispensing devices usually comprise a coating powder spray head for spraying coating powder at their front end region and a coating powder connection at their opposite rear end region. Powder, coating powder in particular, can be fed to a coating powder channel extending to the coating powder spray head via the coating powder connection of the powder dispensing device.

The powder dispensing devices discussed herein relate in particular to powder dispensing devices for coating powder conveyed pneumatically in a flow of compressed air. The coating powder is sprayed through a material outlet of the coating powder spray head at the front end region of the powder dispensing device. The material outlet can be formed for example by a material channel mouth with or without a cross-deflector (impact head or the like), by a nozzle or by a rotational atomizing element.

The coating material, in particular coating powder or even liquid coating, is electrostatically charged preferably by means of static electricity and/or a high voltage of more than 1000 V, e.g. a voltage in the range of between 10,000 V and 140,000 V, in order to thereby achieve better adhesion to the—preferably grounded—object to be coated and to reduce wastage.

Such a powder dispensing device is for example described at least in principle in the DE 44 18 288 A1 printed publication. Same thereby relates to an automatic powder spraying device for the electrostatic spray coating of objects with coating material, particularly coating powder.

This known prior art powder spraying device comprises an elongated housing in the form of a gun barrel, a coating material channel extending through the housing in the housing's longitudinal direction, a nozzle for atomizing the coating material at the downstream front end of the coating material channel, and a high voltage generator accommodated in the housing. The high voltage generator thereby serves in generating a high voltage at a high voltage electrode, by means of which the coating material to be sprayed by the powder spraying device is electrostatically charged.

In this known prior art powder spraying device, all the connecting lines, in particular the connecting line for the coating material to be sprayed, the connecting line for an electrical voltage on the primary side of the high voltage generator, and the compressed air connecting line, are led through a robotic arm and connected on the rear face side of the powder spraying device at which the powder spraying device can for example be secured to a robotic arm. The compressed air supplied to the powder spraying device by way of the compressed air connecting line serves to flow around the high voltage electrode so that no coating material can accumulate on it. Compressed air can furthermore be used during a cleaning process to support the atomizing process or to blow out powder residues in the powder spraying device.

According to DE 44 18 288 A1, the respective rear face sides of a plurality of powder spraying devices are mounted on a carrier which is attached to a robotic arm at its side facing away from the powder spraying device. The high voltage generator is disposed over a powder channel extending through the housing in the housing's longitudinal direction. To accommodate the high voltage generator, the housing has a region which expands upwardly.

A powder dispensing device in the form of a powder spray gun with a powder channel for coating powder extending through its gun barrel is also known from the U.S. Pat. No. 4,196,465 printed publication, wherein the components of a high voltage generator are arranged underneath the powder channel. A handle is detachably secured to the gun barrel so that the gun barrel can also be used without the handle, for example on a stationary stand or on a lift stand or on a robotic arm. When securing the gun barrel to a stand or a robotic arm, said stand or robotic arm needs to have attached arms able to reach through an opening in a wall of a coating booth in which the gun barrel for coating objects is disposed. The connecting lines for the coating material, the electrical voltage and the compressed air likewise extend from the gun barrel through the booth's wall opening separately from each other and, when a lift stand is used, need to be looped so that their sections connected to the gun barrel can move relative to the upstream stationary line sections arranged outside the booth.

The above-described powder dispensing devices known from the prior art are in each case secured in operation to a stand or robot positioned outside of a coating booth by means of a corresponding extension, whereby the extension reaches through an opening in a wall of the coating booth.

Disadvantageous in this context is that cleaning of such powder dispensing devices, for example because of changing powder, is relatively time-consuming and laborious. This is also particularly due to not only the powder dispensing devices themselves needing to be carefully cleaned of powder residues but also the coating material lines led through the extensions, and particularly also the powder lines serving to supply the coating material to be sprayed from a powder reservoir to the coating material lines led through the extensions or the powder dispensing devices respectively.

The cleaning of the coating material lines and the powder lines routed through the extensions is frequently time-consuming since the coating material lines are often only accessible with difficulty. This usually makes it necessary to completely pull the powder dispensing devices out of the coating booth's wall opening again for cleaning purposes.

With respect to cleaning the powder lines via which the powder dispensing devices are fed the coating material to be sprayed from a powder reservoir, it is to be noted that these powder lines are usually relatively long, which likewise leads to relatively time-consuming cleaning in the case of e.g. changing colors.

SUMMARY

The present disclosure is thus based on the task of specifying a solution with which powder dispensing devices which are in particular supported by a stationary stand disposed outside of a coating booth or by a lift stand disposed outside of a coating booth or by another positioning device can be more efficiently switched between a first type or kind of powder to a second type or kind of powder, and namely particularly in terms of the time and the effort. In particular, it should no longer be necessary to lead powder supply lines through wall openings in the coating booth in order to switch between different types/kinds of powder.

A powder separating filter and a powder dispensing system are disclosed herein.

According thereto, in particular proposed is a powder separating filter which comprises a first powder inlet and at least one further second powder inlet as well as a powder outlet, whereby either the first powder inlet or the at least one second powder inlet can be selectively fluidly connected to the powder outlet of the powder separating filter. This thereby enables different types and/or kinds of powder to be alternatingly supplied by means of the powder separating filter to a powder dispensing device, in particular an automatic powder spraying device, fluidly connected to the powder outlet of the powder separating filter. When switching between different types or respectively kinds of powder, it thus becomes no longer necessary to clean the powder supply lines to the powder dispensing device (in particular automatic powder spraying device) since there is preferably one powder supply line provided for each kind/type of powder to be sprayed which is able to be fluidly connected to the powder outlet of the powder separating filter as needed in order to thus enable a feed of said coating powder to the powder dispensing device likewise fluidly connected to the powder outlet of the powder separating filter. The inventive solution in particular enables an automatic powder hose change among different powder sources for powder dispensing devices.

The powder separating filter according to the present disclosure in particular serves in the selective supplying of different kinds and/or types of powder to a powder dispensing system configured as an automatic powder spraying device and which can comprise a spray nozzle or a rotational atomizing element.

BRIEF DESCRIPTION OF THE DRAWINGS

The following will make reference to an example embodiment depicted in the accompanying drawings in describing the invention in greater detail.

Shown are.

DETAILED DESCRIPTION

The following will reference the accompanying drawings in describing an example embodiment of a powder dispensing system 100 which makes use of a powder dispensing device 50 together with a powder separating filter 1. The powder separating filter 1 enables—in the course of an automatic powder hose change—different kinds and/or types of powder to be selectively supplied to the powder dispensing device 50.

The powder dispensing device 50 relates in particular to an automatic powder spraying device for the spraying of coating powder, whereby the coating powder is in particular conveyed pneumatically in a flow of compressed air, for example by means of an injector pump or by means of a dense phase pump.

Figure 1:
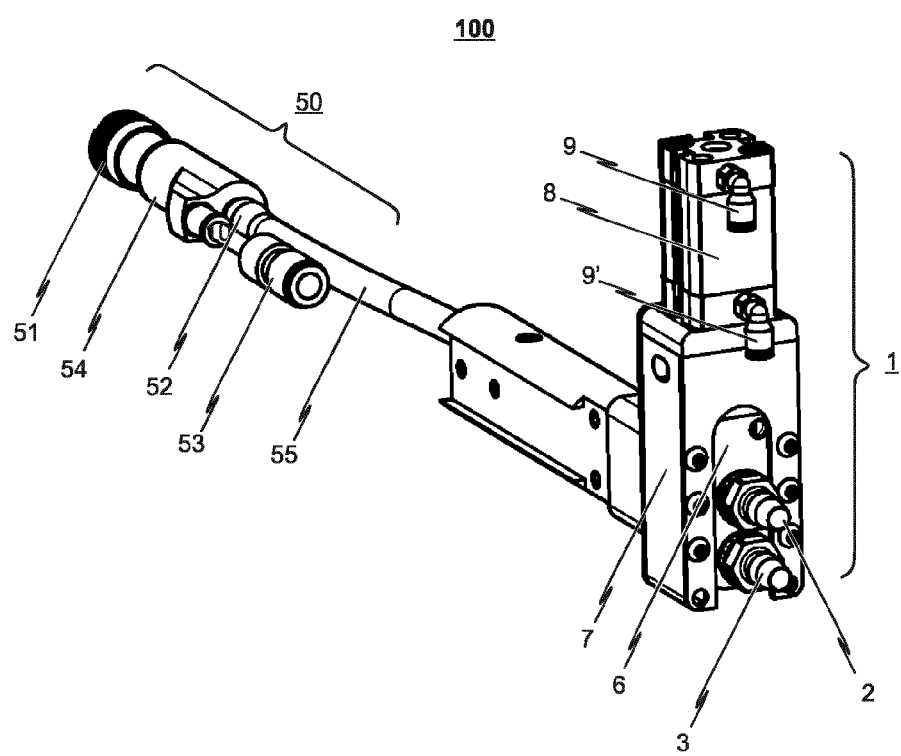
FIG. 1 an isometric view of an example embodiment of the powder dispensing system according to the invention comprising a powder separating filter as well as a powder dispensing device fluidly connected to the powder outlet of the powder separating filter.
Figure 2:
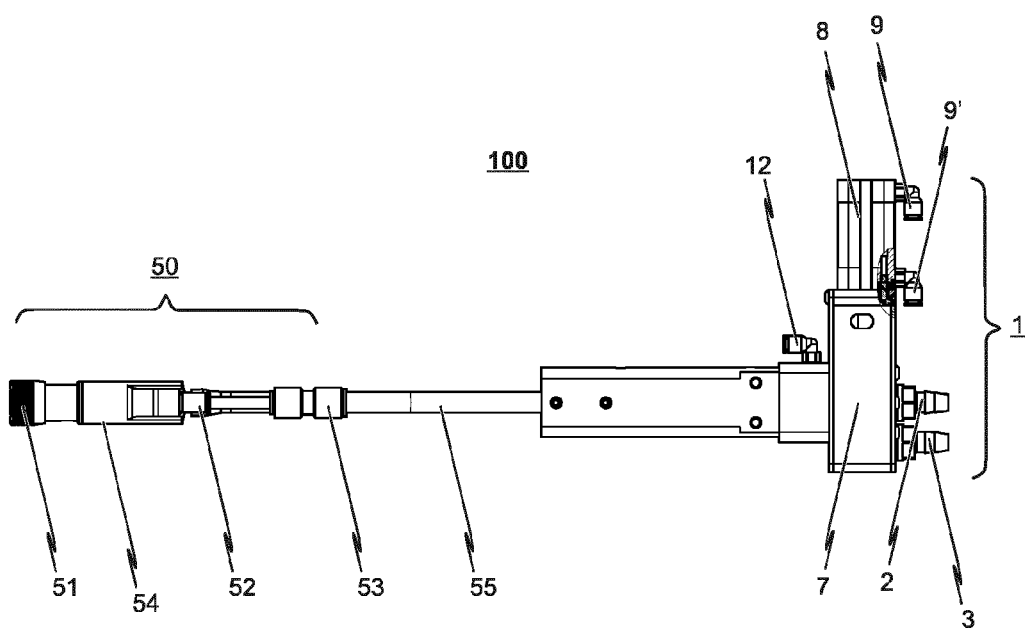
FIG. 2 a side view of the powder dispensing system according to FIG. 1.
Figure 3:
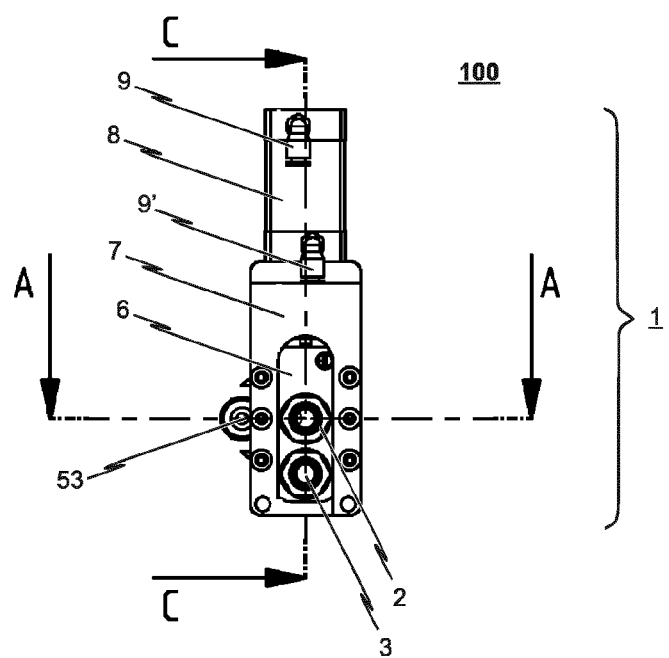
FIG. 3 a rear view of the powder dispensing system according to FIG. 1.

In the embodiment of the powder dispensing system 100 depicted as an example in FIG. 1, the powder dispensing device 50 configured here as an automatic spray coating gun exhibits a shaft housing 54, at the front end region of which a coating powder spray head 51 is or can be attached. This coating powder spray head 51 forms a coating material discharge outlet.

A compressed gas connection 53 is formed at the rear end region of the shaft housing 54 which serves in the connecting of at least one compressed gas line.

A coating powder connection 52 is furthermore formed on the rear end region of the shaft housing 54 which serves in the connecting of at least one coating powder line 55.

In the example embodiment of the powder dispensing system 100 shown in the drawings, the powder line 55 is designed as a relatively rigid powder tube in which a powder channel is formed. The powder line 55 configured as a powder tube simultaneously serves as a support for supporting the coating powder spray head 51 in the example embodiment depicted in the drawings.

In order to be able to supply the coating powder spray head 51 of the powder dispensing device 50 with different kinds and/or types of powder via the powder line 55 without needing to clean the powder hoses leading to the respective powder reservoirs provided for the purpose, the powder dispensing system 100 comprises a powder separating filter 1. The structure and the functioning of said powder separating filter 1 will be described in greater detail below with reference to the representations provided in FIGS. 5 and 6.

The example embodiment of the powder dispensing system 100 in particular makes use of a powder separating filter 1 having a first powder inlet 2 and at least one further second powder inlet (here exactly one further second powder inlet 3). The first powder inlet is fluidly connected or connectable to a first powder reservoir by means of a powder line (not depicted in the drawings), particularly in the form of a powder hose, while the second powder inlet 3 is fluidly connected or connectable to a second powder reservoir by means of a second powder line, particularly powder hose (likewise not depicted in the drawings).

It is hereby expedient for the first or respectively the second powder inlet 2, 3 of the powder separating filter to in each case be implemented as a hose connection to which a respective powder hose fluidly connected to the applicable powder reservoir can be connected.

Figure 4:
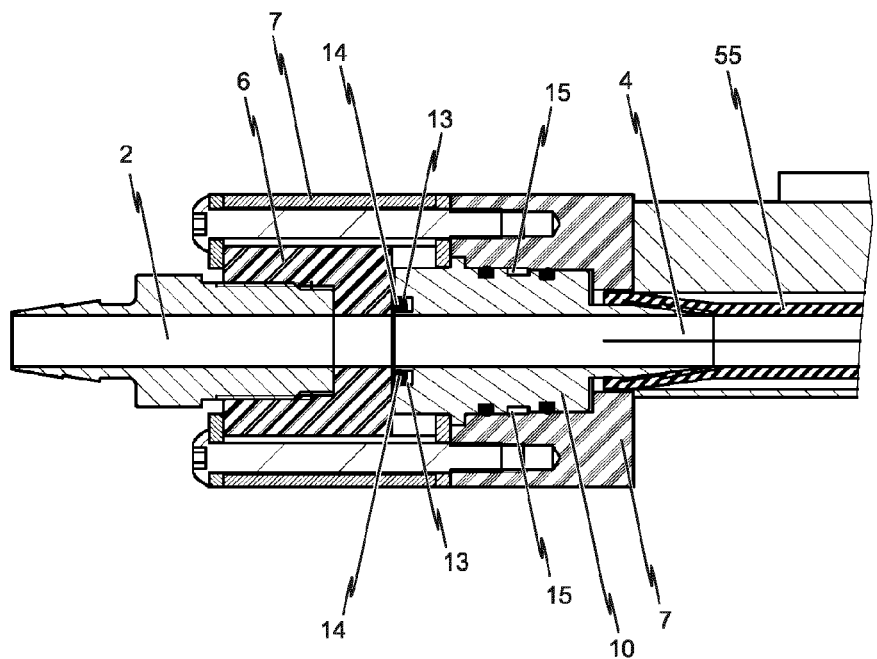
FIG. 4 a sectional view along the A-A line in FIG. 3.

The powder separating filter 1 further comprises a (single) powder outlet 4 (see e.g. FIG. 4). This powder outlet 4 is fluidly connected at its downstream end region to the powder line 55 leading to the coating powder spray head 51. On the other hand, the upstream end region of the powder outlet 4 is selectively fluidly connectable to either the first powder inlet 2 or the second powder inlet 3 so as to thereby fluidly connect the powder line 55 or the coating powder spray head 51 respectively of the powder dispensing device 50 to a first or a second powder reservoir as needed.

So that the powder outlet 4 of the powder separating filter 1 can selectively be fluidly connected to the first or second powder inlet 2, 3 of the powder separating filter 1, an actuating element 5 is provided in the example embodiment depicted in the drawings (see FIG. 5), to which the first and the second powder inlet 2, 3 are coupled in such a manner as to be movable relative to the powder outlet 4 of the powder separating filter 1.

Figure 5:
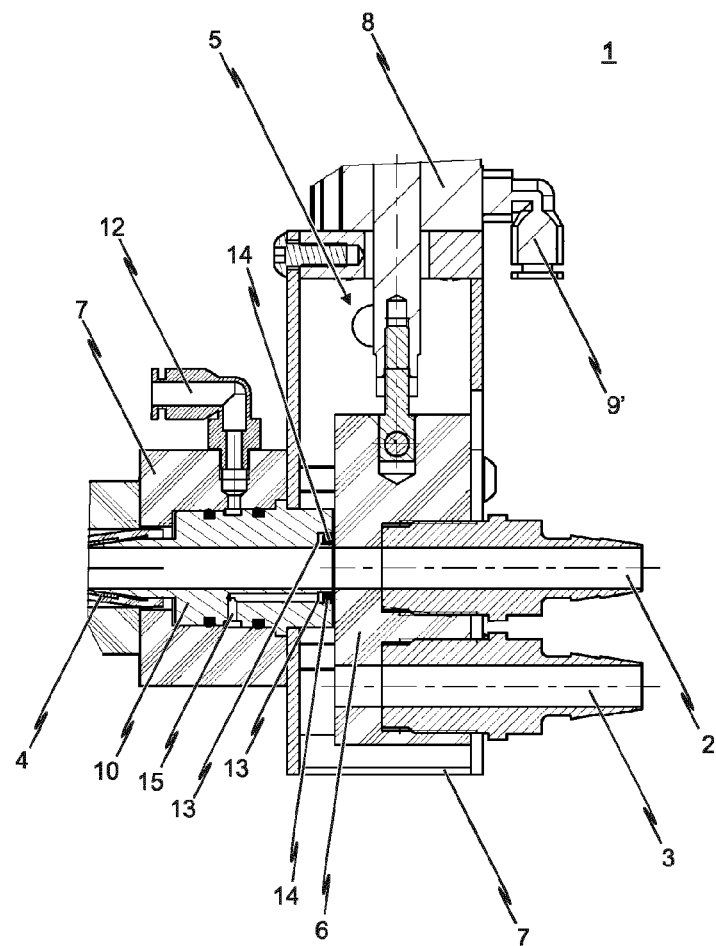
FIG. 5 a sectional view along the C-C line in FIG. 3.

Specifically, in the example embodiment, the first and the second powder inlet 2, 3 of the powder separating filter 1 are coupled to the actuating element 5 such that the first and the second powder inlet 2, 3 can be conveyed from a first position, in which only the first powder inlet 2 is fluidly connected to the powder outlet 4, into a second position and vice versa, wherein in the second position, only the second powder inlet 3 is fluidly connected to the powder outlet 4 of the powder separating filter 1. FIG. 5 thus shows the powder separating filter in a state in which the first and the second powder inlet 2, 3 of the powder separating filter 1 are in the first position.

It is in particular provided with the example embodiment depicted in the drawings for the first and the second powder inlet 2, 3 of the powder separating filter 1 to be movable together relative to the powder outlet 4 by means of the actuating element 5. To this end, the example embodiment depicted in the drawings provides for the actuating element 5 to comprise a carriage assembly 6 which is in particular guided in a housing 7 of the powder separating filter 1 in which the first powder inlet 2 and the second powder inlet 3 of the powder separating filter 1 are accommodated. The carriage assembly 6 is thereby movable relative to the powder outlet 4 of the powder separating filter 1.

In example embodiment depicted in the drawings, the carriage assembly 6 is displaceable relative to the powder outlet 4 of the powder separating filter 1. In conjunction hereto, however, it is also conceivable for the first and second powder inlet 2, 3 of the powder separating filter to be pivotable relative to the powder outlet 4 of the powder separating filter 1.

In order to be able to realize a movement of the carriage assembly 6 together with the first and second powder inlet 2, 3 relative to the powder outlet 4 of the powder separating filter 1, the actuating element 5 preferably comprises a drive, in particular a manually, pneumatically, electrically or hydraulically operated drive, to which the carriage assembly 6 is operatively connected.

In the example embodiment depicted in the drawings, the drive 8 is designed as a pneumatically actuated drive which in particular comprises at least one pneumatic cylinder. The pneumatic cylinder can be supplied with compressed air via corresponding pressure connections 9, 9' in order to realize a switching of the powder separating filter 1. Of course, other types of drives, particularly linear drives, are obviously also conceivable for the displacing or pivoting of the carriage assembly 6.

The example embodiment of the powder separating filter 1 depicted in the drawings provides for the carriage assembly 6 to be movable relative to the powder outlet 4, and specifically perpendicular to a powder-conveying direction defined by the powder outlet 4 of the powder separating filter 1. In the example embodiment according to the drawings, the powder-conveying direction essentially corresponds to the longitudinal direction of powder line 55.

According to one aspect of the present disclosure, it is provided for the powder separating filter 1 to also be able to be switched into a lock mode in which neither the first powder inlet 2 nor the second powder inlet 3 is fluidly connected to the powder outlet 4.

Figure 6:
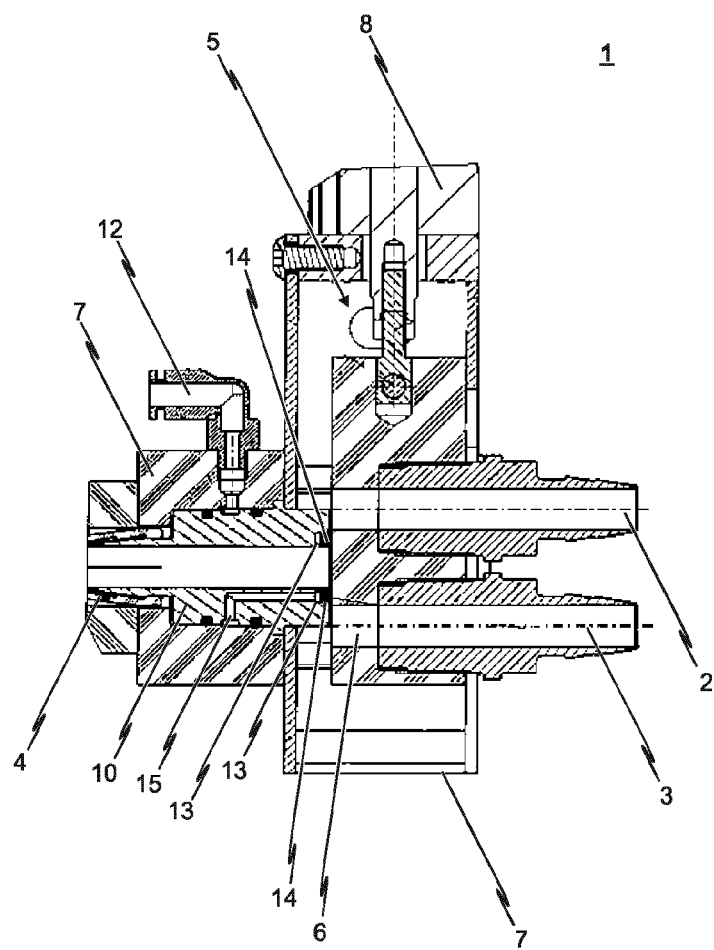
FIG. 6 a sectional view of the powder separating filter used in the powder dispensing system shown in FIG. 1 in a lock mode.

An example of the lock mode of the powder separating filter 1 shown in the drawings is depicted in FIG. 6. In this lock mode, the first and second powder inlet 2, 3 are conveyed by means of the actuating element 5 into a third position in which neither the first powder inlet 2 nor the second powder inlet 3 is fluidly connected to the powder outlet 4 of the powder separating filter 1.

In order to enable the most frictionless possible movement of the carriage assembly 6 relative to the powder outlet 4 of the powder separating filter 1 (when switching the type/kind of powder to be fed to the powder dispensing device 50), a further development of the present disclosure provides for the powder outlet 4 of the powder separating filter 1 to be movable relative to the carriage assembly 6, and namely preferably in a direction of a powder-conveying direction defined by the powder outlet 4 which at least substantially corresponds to the direction of extension of powder line 55 in the example embodiment depicted in the drawings.

Specifically, and as can particularly be noted from the representations provided in FIGS. 4, 5 and 6, it is to that end provided for the powder inlet 4 of the powder separating filter 1 to be configured in a powder outlet block 10, whereby said powder outlet block 10 is accommodated in the housing 7 of the powder separating filter 1, and namely preferably so as to be movable in the powder-conveying direction relative to the housing 7.

In order to be able to realize this movement (a traveling of the powder outlet block 10 relative to the housing 7 of the powder separating filter 1) as automati-cally as possible, a corresponding drive or similar mechanism is preferentially provided (not depicted in the drawings). Said drive can for example be configured as a pneumatically actuated drive.

Additionally or alternatively thereto, it is however also conceivable for a groove 13 to be configured in the powder outlet block 10 into which a sealing ring 14, e.g. an elastomer ring, is inserted. As it can be noted from the sectional view for example in FIG. 5, the groove 13 is fluidly connected to a pressure connection 12 by means of a compressed gas channel system 15. When the compressed gas channel system 15 is pressurized via the pressure connection 12, the sealing ring inserted into the groove 13 is pressed against the carriage assembly 6 so as to enable a sealing, this being particularly advantageous when the first and second powder inlet 2, 3 are in their first or second position.

To move or respectively pivot the carriage assembly 6 relative to the powder outlet block 10, the compressed gas channel system 15 is preferably bled so that the contact pressure of the sealing ring 14 is neutralized. This enables a low-friction movement of the carriage assembly 6 relative to the powder outlet block 10.

Although not depicted in the drawings, it is of course also conceivable for the powder separating filter 1 to be provided with a preferably releasable locking in order to lock the carriage assembly 6 into each of the positions set by means of the actuating element 5.

The invention is not limited to the example embodiment depicted in the figures but rather yields from an integrated consideration of all the features disclosed herein in context.

LIST OF REFERENCE NUMERALS

1 powder separating filter
2 first powder inlet
3 second powder inlet
4 powder outlet
5 actuating element
6 carriage assembly 7 housing
8 drive
9, 9' pressure connection
10 powder outlet block
12 pressure connection
13 groove
14 sealing ring
15 compressed gas channel system
50 powder dispensing device
51 coating powder spray head
52 coating powder connection
53 compressed gas connection
54 shaft housing
53 powder line
53 powder dispensing system

The invention claimed is:

1. A powder separating filter for alternatingly supplying different types and/or kinds of powders to a powder dispensing device, wherein the powder separating filter comprises:
a first powder inlet and at least one second powder inlet; and
a powder outlet,
wherein either the first powder inlet or the at least one second powder inlet is alternatingly fluidly connectable to the powder outlet of the powder separating filter,
wherein an actuating element is provided, to which the first powder inlet and the at least one second powder inlet are coupled in such a manner as to be movable relative to the powder outlet of the powder separating filter,
wherein the actuating element comprises a carriage assembly in which the first powder inlet and the at least one second powder inlet are accommodated,
wherein the carriage assembly is movable relative to the powder outlet perpendicular to a powder-conveying direction defined by the powder outlet, and
wherein the powder outlet is movable relative to the carriage assembly in the powder-conveying direction defined by the powder outlet.

2. The powder separating filter according to claim 1, wherein the powder separating filter is selectively switchable from a powder supply mode, in which either the first powder inlet or the at least one second powder inlet is fluidly connected to the powder outlet, into a lock mode and vice versa, wherein in the lock mode, neither the first powder inlet nor the at least one second powder inlet is fluidly connected to the powder outlet.

3. The powder separating filter according to claim 1, wherein the first and the at least one second powder inlet are thereby coupled to the actuating element such that the first and the at least one second powder inlet can be conveyed from a first position in which only the first powder inlet is fluidly connected to the powder outlet into a second position and vice versa, wherein in the second position, only the at least one second powder inlet is fluidly connected to the powder outlet.

4. The powder separating filter according to claim 3, wherein the first and the at least one second powder inlet are thereby coupled to the actuating element such that the first and the at least one second powder inlet can be selectively conveyed into a third position in which neither the first powder inlet nor the at least one second powder inlet is fluidly connected to the powder outlet.

5. The powder separating filter according to claim 1, wherein the first and the at least one second powder inlet are movable together relative to the powder outlet by means of the actuating element.

6. The powder separating filter according to claim 1, wherein the actuating element comprises a drive that is manually, pneumatically, electrically or hydraulically operated, to which the carriage assembly is operatively connected.

7. The powder separating filter according to claim 1, wherein the powder outlet is configured in a powder outlet block which is accommodated in a housing of the powder separating filter and is movable in a powder-conveying direction relative to the housing.

8. The powder separating filter according to claim 7, wherein a pneumatically operated drive is further provided for moving the powder outlet block relative to the actuating element or the housing of the powder separating filter respectively.

9. The powder separating filter according to claim 8, wherein the drive is designed to convey the powder outlet block from a first position in which the powder outlet block is at a distance from the actuating element into a second position or vice versa, wherein in the second position of the powder outlet block, the powder outlet block abuts against the actuating element.

10. The powder separating filter according to claim 1, wherein the first and/or the at least one second powder inlet is implemented as a hose connection to which a powder hose can be connected for supplying powder to the powder separating filter.

11. The powder separating filter according to claim 1, wherein the powder outlet of the powder separating filter is fluidly connectable to a powder line to feed coating powder to a powder dispensing device and/or to a coating powder spray head of a powder dispensing device.

12. A powder dispensing system comprising a powder separating filter according to claim 1 and a powder dispensing device, in the form of an automatic powder spray gun, wherein the powder outlet of the powder separating filter is fluidly connected to a coating powder spray head of the powder dispensing device.

13. A powder separating filter for alternatingly supplying different types and/or kinds of powders to a powder dispensing device, wherein the powder separating filter comprises:
a first powder inlet and at least one second powder inlet; and
a powder outlet,
wherein either the first powder inlet or the at least one second powder inlet is alternatingly fluidly connectable to the powder outlet of the powder separating filter,
wherein an actuating element is provided, to which the first and the at least one second powder inlet are coupled in such a manner as to be movable relative to the powder outlet of the powder separating filter,
wherein the actuating element comprises a carriage assembly in which the first powder inlet and the at least one second powder inlet are accommodated, wherein the carriage assembly is movable by displacement or pivoting relative to the powder outlet,
wherein the carriage assembly is movable relative to the powder outlet perpendicular to a powder-conveying direction defined by the powder outlet, and
wherein the powder outlet is movable relative to the carriage assembly in the powder-conveying direction defined by the powder outlet.

14. The powder separating filter according to claim 13, wherein the powder outlet is configured in a powder outlet block which is accommodated in a housing of the powder separating filter and is movable in a powder-conveying direction relative to the housing.

15. The powder separating filter according to claim 14, wherein a pneumatically operated drive is further provided for moving the powder outlet block relative to the actuating element or the housing of the powder separating filter respectively.

16. The powder separating filter according to claim 15, wherein the drive is designed to convey the powder outlet block from a first position in which the powder outlet block is at a distance from the actuating element into a second position or vice versa, wherein in the second position of the powder outlet block, block abuts against the actuating element.

17. The powder separating filter according to claim 13, wherein the powder separating filter is selectively switchable from a powder supply mode, in which either the first powder inlet or the at least one second powder inlet is fluidly connected to the powder outlet, into a lock mode and vice versa, wherein in the lock mode, neither the first powder inlet nor the at least one second powder inlet is fluidly connected to the powder outlet.

18. The powder separating filter according to claim 13, wherein the first and the at least one second powder inlet are thereby coupled to the actuating element such that the first and the at least one second powder inlet can be conveyed from a first position in which only the first powder inlet is fluidly connected to the powder outlet into a second position and vice versa, wherein in the second position, only the at least one second powder inlet is fluidly connected to the powder outlet.

19. The powder separating filter according to claim 18, wherein the first and the at least one second powder inlet are thereby coupled to the actuating element such that the first and the at least one second powder inlet can be selectively conveyed into a third position in which neither the first powder inlet nor the at least one second powder inlet is fluidly connected to the powder outlet.

20. The powder separating filter according to claim 13, wherein the first and the at least one second powder inlet are movable together relative to the powder outlet by means of the actuating element.

21. The powder separating filter according to claim 13, wherein the actuating element comprises a drive that is manually, pneumatically, electrically or hydraulically operated, to which the carriage assembly is operatively connected.

22. A powder dispensing system comprising a powder separating filter according to claim 13 and a powder dispensing device, in the form of an automatic powder spray gun, wherein the powder outlet of the powder separating filter is fluidly connected to a coating powder spray head of the powder dispensing device.

* * * * *